United States Patent
Her

(10) Patent No.: US 9,784,892 B2
(45) Date of Patent: Oct. 10, 2017

(54) DISPLAY DEVICES AND METHODS OF MANUFACTURING DISPLAY DEVICES

(71) Applicant: SAMSUNG DISPLAY CO., LTD., Yongin, Gyeonggi-Do (KR)

(72) Inventor: Yong-Koo Her, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/533,250

(22) Filed: Nov. 5, 2014

(65) Prior Publication Data

US 2015/0131155 A1  May 14, 2015

(30) Foreign Application Priority Data

Nov. 13, 2013 (KR) .................. 10-2013-0137362

(51) Int. Cl.
*G02B 5/02* (2006.01)
*G02F 1/1335* (2006.01)
*G02F 1/1333* (2006.01)

(52) U.S. Cl.
CPC ............ *G02B 5/0221* (2013.01); *G02B 5/021* (2013.01); *G02B 5/0236* (2013.01); *G02B 5/0268* (2013.01); *G02B 5/0278* (2013.01); *G02F 1/133512* (2013.01); *G02F 1/133526* (2013.01); *G02F 2001/133388* (2013.01); *Y10T 29/49002* (2015.01)

(58) Field of Classification Search
CPC ............ H01L 51/5234; H01L 51/5262; H01L 51/5281; H01L 2251/5361; H01L 2924/12044; H01L 33/20; H01L 33/24; H01L 33/405; H01L 33/44; H01L 33/46; H01L 51/50; H01L 51/5275; G02B 27/281; G02B 5/0236; G02B 3/0037; G02B 5/021; G02B 5/0221; G02B 5/02; G02F 1/133526; G02F 1/133504

See application file for complete search history.

(56) References Cited

U.S. PATENT DOCUMENTS

| | | | | |
|---|---|---|---|---|
| 6,295,107 | B1 * | 9/2001 | Watanabe | G02F 1/133526 349/110 |
| 6,653,157 | B2 * | 11/2003 | Kondo | H01L 29/0657 257/E29.022 |
| 2003/0207484 | A1 * | 11/2003 | Nishikawa | G02B 3/0031 438/31 |
| 2005/0053777 | A1 * | 3/2005 | Hilliard | G01R 29/0885 428/212 |

(Continued)

FOREIGN PATENT DOCUMENTS

| KR | 10-2012-0136270 A | 12/2012 |
|---|---|---|
| KR | 10-2013-0007165 A | 1/2013 |

(Continued)

*Primary Examiner* — Scott J Sugarman
*Assistant Examiner* — Balram Parbadia
(74) *Attorney, Agent, or Firm* — Lee & Morse, P.C.

(57) ABSTRACT

A display device includes a first substrate having a display region and a peripheral region, a display structure in the display region, a second substrate parallel to the first substrate, the second substrate including a light scattering structure in the display region, the light scattering structure being configured to scatter light generated in the display structure, and a shielding member adjacent to the light scattering structure.

21 Claims, 9 Drawing Sheets

(56) References Cited

U.S. PATENT DOCUMENTS

| | | | |
|---|---|---|---|
| 2007/0164662 A1* | 7/2007 | Eida | H01L 51/5284 |
| | | | 313/504 |
| 2007/0216827 A1* | 9/2007 | Okada | G02B 3/0031 |
| | | | 349/62 |
| 2010/0065862 A1* | 3/2010 | Ray | B82Y 20/00 |
| | | | 257/88 |
| 2010/0078670 A1* | 4/2010 | Kim | H01L 33/46 |
| | | | 257/98 |
| 2010/0159792 A1 | 6/2010 | Visser et al. | |
| 2012/0307191 A1 | 12/2012 | Park et al. | |
| 2013/0001600 A1 | 1/2013 | Lim et al. | |

FOREIGN PATENT DOCUMENTS

| | | |
|---|---|---|
| KR | 10-2013-0008096 A | 1/2013 |
| KR | 10-2013-0024511 A | 3/2013 |

* cited by examiner

DISPLAY DEVICES AND METHODS OF MANUFACTURING DISPLAY DEVICES

CROSS REFERENCE TO RELATED APPLICATION

Korean patent Application No. 10-2013-0137362, filed on Nov. 13, 2013, in the Korean Intellectual Property Office, and entitled: "Display Devices and Methods of Manufacturing Display Devices," is incorporated by reference herein in its entirety.

BACKGROUND

1. Field

Example embodiments relate to display devices and methods of manufacturing display devices. More particularly, example embodiments relate to display devices including light scattering structures and methods of manufacturing the display devices having the light scattering structures.

2. Description of the Related Art

In the conventional organic light emitting display device, lights generated in an organic light emitting layer may be superimposed on one another, and the superimposed lights may have strong linearity. As for the conventional organic light emitting display device, when the lights have strong linearity, a color shift phenomenon of images displayed on the organic light emitting display device may occur. For example, when a user watches obliquely the organic light emitting display device, the color shift phenomenon of images may result in deterioration of quality of the images.

SUMMARY

According to one aspect of the example embodiments, there is provided a display device including a first substrate having a display region and a peripheral region, a display structure in the display region, a second substrate parallel to the first substrate, the second substrate including a light scattering structure in the display region, the light scattering structure being configured to scatter light generated in the display structure, and a shielding member adjacent to the light scattering structure.

In example embodiments, the light scattering structure may include at least one recess. For example, the recess may have a substantially rounded bottom surface.

In some example embodiments, the light scattering structure may additionally include a transparent member substantially buried in the recess.

In example embodiments, a refractive index of the transparent member may be different from a refractive index of the second substrate. For example, the transparent member may include polyimide-based resin, photoresist, acrylic-based resin, polyamide-based resin, siloxane-based resin, etc.

In some example embodiments, the light scattering structure may include a plurality of recesses.

In some example embodiments, the light scattering structure may additionally include a plurality of transparent members substantially filling the recesses.

In some example embodiments, the light scattering structure may include at least one protrusion. For example, the protrusion may have a substantially rounded top surface.

In some example embodiments, the light scattering structure may include a plurality of protrusions.

In example embodiments, the second substrate may include a plurality of organic layers and a plurality of inorganic layers which may be disposed alternately.

In example embodiments, the light scattering structure may include at least one recess formed in an uppermost inorganic layer and an uppermost organic layer.

In some example embodiments, the light scattering structure may include at least one protrusion disposed on an uppermost inorganic layer.

According to another aspect of example embodiments, there is provided a method of manufacturing a display device. In the method, a first substrate having a display region and a peripheral region may be formed. A display structure may be formed in the display region. A second substrate may be formed on the display structure. A light scattering structure may be formed in the display region of the second substrate. A shielding member may be formed in a peripheral region. The shielding member may be adjacent to the light scattering structure.

In the formation of the light scattering structure according to example embodiments, at least one recess may be formed by partially etching the second substrate in the display region.

In the formation of the light scattering structure according to some example embodiments, at least one transparent member may be additionally formed to fill the at least one recess.

In the formation of the light scattering structure according to some example embodiments, at least one protrusion may be formed in the display region by partially etching the second substrate in the peripheral region.

In example embodiments, forming the second substrate may be obtained by alternately stacking a plurality of organic layers and a plurality of inorganic layers on the display structure.

In the formation of the light scattering structure according to example embodiments, at least one recess may be formed in an uppermost organic layer and an uppermost inorganic layer, or at least one protrusion may be formed on an uppermost inorganic layer.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
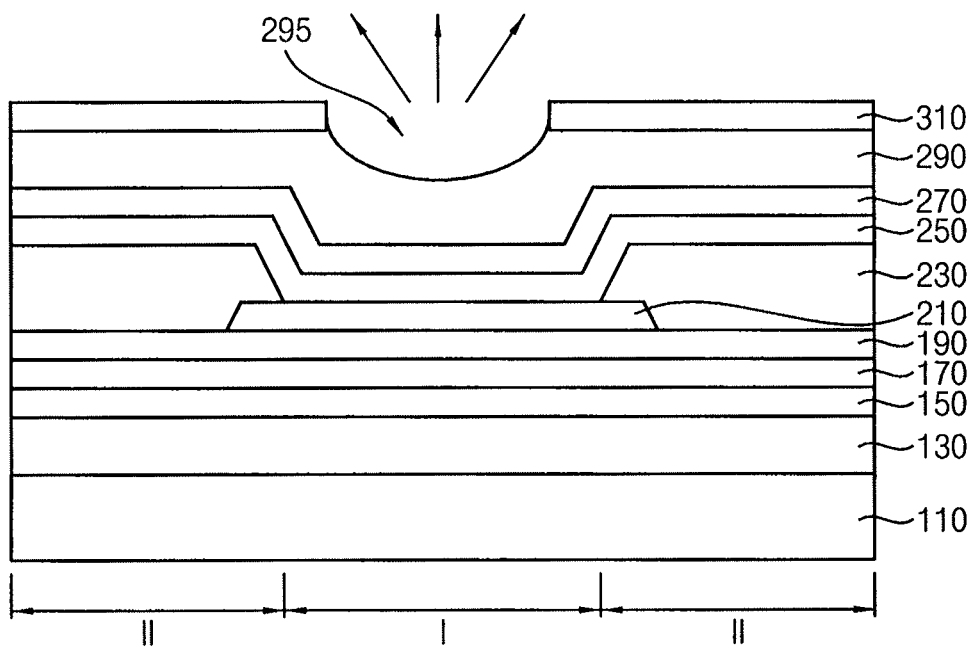
FIG. 1 illustrates a cross-sectional view of a display device in accordance with example embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 is a cross-sectional view of a display device in accordance with example embodiments. For example, FIG. 1 illustrates a display device that includes at least one recess as a light scattering structure.

Referring FIG. 1, a display device 100 may include a first substrate 110, a display structure, a second substrate 290 having a light scattering structure 295, a shielding member 310, etc. In the display device 100 illustrated in FIG. 1, the display structure may include a switching element 150, a first electrode 190, a light emitting layer 210, a pixel defining layer 230, a second electrode 250, etc.

The display device 100 may include a display region I, e.g., an active region, and a peripheral region II. Here, the peripheral region II may substantially surround the display region I.

The first substrate 110 may include a transparent inorganic material or a flexible plastic. For example, the first substrate 110 may include a glass substrate, a quartz substrate, a transparent resin substrate, etc.

An insulating layer 130 may be disposed on the first substrate 110. The insulating layer 130 may include an inorganic material. For example, the insulating layer 130 may include a silicon compound, e.g., silicon oxide ($SiO_x$), silicon nitride ($SiN_x$), silicon oxynitride ($SiO_xN_y$), silicon oxycarbide ($SiO_xC_y$), silicon carbonitride ($SiC_xN_y$), etc. In some example embodiments, the insulating layer 130 may include an organic material. For example, the insulating layer 130 may include a polyimide-based resin, a photoresist, an acrylic-based resin, a polyamide-based resin, a siloxane-based resin, etc. These may be used alone or in a combination thereof.

The switching element 150 may be disposed on the insulating layer 130. For example, the switching element 150 may correspond to a transistor having a gate electrode, a gate insulating layer, an active layer, an etching stop layer, a source electrode, a drain electrode, etc. In some example embodiments, the switching element 150 may correspond to an oxide semiconductor device including an active layer containing an oxide semiconductor. The switching element 150 may be contacted electrically with the first electrode 190.

An insulating interlayer 170 may include silicon oxide, metallic oxide, etc. For example, the insulating interlayer 170 may include silicon oxide, silicon nitride, silicon oxynitride, silicon oxycarbide, silicon carbonitride, hafnium oxide ($HfO_x$), aluminum oxide ($AlO_x$), zirconium oxide ($ZrO_x$), titanium oxide ($TiO_x$), tantalum oxide ($TaO_x$), etc. These may be used alone or in a combination thereof. The insulating interlayer 170 may insulate the first electrode 190 from underlying structures.

The first electrode 190 may be disposed on the insulating interlayer 170. The first electrode 190 may include metal, alloy, metallic nitride, conductive metal oxide, a transparent conductive material, etc. For example, the first electrode 190 may include aluminum (Al), aluminum alloy, aluminum nitride ($AlN_x$), silver (Ag), silver alloy, tungsten (W), tungsten nitride ($WN_x$), copper (Cu), copper alloy, nickel (Ni), chromium (Cr), chromium nitride ($CrN_x$), molybdenum (Mo), molybdenum alloy, titanium (Ti), titanium nitride ($TiN_x$), platinum (Pt), tantalum (Ta), tantalum nitride ($TaN_x$), neodymium (Nd), scandium (Sc), strontium ruthenium oxide (SRO), zinc oxide ($ZnO_x$), indium tin oxide (ITO), tin oxide ($SnO_x$), indium oxide ($InO_x$), gallium oxide ($GaO_x$), indium zinc oxide (IZO), etc. These may be used alone or in a combination thereof.

Referring again to FIG. 1, the light emitting layer 210 may be disposed on the first electrode 190. The light emitting layer 210 may include a hole injection layer (HIL), a hole transfer layer (HTL), an organic light emitting layer (EL), an electron transfer layer (ETL), an electron injection layer (EIL), etc. In example embodiments, the organic light emitting layer of the light emitting layer 210 may include light emitting materials capable of generating different colors of light such as red color of light, blue color of light, and green color of light in accordance with the types of the pixels in the display device 100. In some example embodiments, the organic light emitting layer of the light emitting layer 210 may generate substantially white color of light by stacking a plurality of light emitting materials capable of generating different colors of light such as red color of light, green color of light, blue color of light, etc. In example embodiments, the display device 100 may have a resonance construction including the insulating layer 130, the insulating interlayer 170, the first electrode 190, the second electrode 250, etc. In this case, lights generated from the light emitting layer 210 may be substantially superimposed on one another, and the superimposed lights may be emitted outward.

The pixel defining layer 230 may be disposed on the first electrode 190 and the light emitting layer 210. The pixel defining layer 230 may substantially cover the first electrode 190 and the light emitting layer 210 in the peripheral region II. A first region in which the light emitting layer 210 is exposed by the pixel defining layer 230 may be referred to as the display region I of the display device 100, and a second region adjacent to the first region may be referred to as the peripheral region II of the display device 100. The pixel defining layer 230 may include an inorganic insulating material, e.g., silicon oxide, silicon nitride, silicon oxynitride, silicon oxycarbide, silicon carbonitride, etc. In some example embodiments, the pixel defining layer 230 may include an organic insulating material. For example, the pixel defining layer 230 may include a polyimide-based resin, a photoresist, an acrylic-based resin, a polyamide-based resin, a siloxane-based resin, etc. These may be used alone or in a combination thereof.

The second electrode 250 may be disposed on the pixel defining layer 230 and the light emitting layer 210. The second electrode 250 may include metal, alloy, metallic nitride, conductive metal oxide, a transparent conductive material, etc. For example, the second electrode 250 may include aluminum, aluminum alloy, aluminum nitride, silver, silver alloy, tungsten, tungsten nitride, copper, copper alloy, nickel, chromium, chromium nitride, molybdenum, molybdenum alloy, titanium, titanium nitride, platinum, tantalum, tantalum nitride, neodymium, scandium, strontium ruthenium oxide, zinc oxide, indium tin oxide, tin oxide, indium oxide, gallium oxide, indium zinc oxide, etc. These may be used alone or in a combination thereof.

A protection layer 270 may be disposed on the second electrode 250. The protection layer 270 may be formed, e.g., using silicon oxide, metal oxide, etc. For example, protection layer 270 may include silicon oxide, silicon nitride, silicon oxynitride, silicon oxycarbide, silicon carbonitride, hafnium oxide, aluminum oxide, zirconium oxide, titanium oxide, tantalum oxide, etc. These may be used alone or in a combination thereof. The protection layer 270 may protect underlying structures including the second electrode 250.

The shielding member 310 may be disposed in the peripheral region II of the second substrate 290. The shielding member 310 may include metal, metal oxide, etc. For example, the shielding member 310 may include chromium (Cr), chromium oxide ($CrO_x$), etc. The shielding member 310 may have a color capable of substantially reflecting light and/or to block light incident from an outside. For example, the color of the shielding member 310 may be substantially black.

The second substrate 290 may be substantially opposed, e.g., parallel, to the first substrate 110, and may be disposed on, e.g., directly on, the protection layer 270. The second substrate 290 may include a transparent inorganic material or a flexible plastic. For example, the second substrate 290 may include a glass substrate, a quartz substrate, a transparent resin substrate, etc.

In example embodiments, as illustrated in FIG. 1, the light scattering structure 295 may be located in the display region I of the second substrate 290. The light scattering structure 295 may correspond to, e.g., be, a recess having a substantially rounded bottom surface of a substantially semi-circular or substantially semi-elliptical shape. For example, the light scattering structure 295, i.e., the recess, may overlap a majority of the display region I, but have a smaller width than a width of the opening in the pixel defining layer 230. For example, the light scattering structure 295 may overlap a center of the light emitting layer 210. For example, the light scattering structure 295 may be exposed through an opening in the shielding member 310, so the width of the light scattering structure 295 may equal the width of the opening in the shielding member 310. For example, the light scattering structure 295 having the recess shape may have a depth below about 1.0 µm when a length of the display region I is about 20 µm to about 30 µm.

In accordance with example embodiments, when the display device 100 has a resonance construction, a portion of light generated in the light emitting layer 210 may pass through the second electrode 250 according to the transmissivity of the second electrode 250, and other portions of the generated light may be reflected by the second electrode 250. The reflected light may also be reflected by the first electrode 190 or by the underlying structures including the insulating interlayer 170, the switching element 150, the insulating layer 130, etc.

In case that display device 100 is a top emission type, the first electrode 190 and/or the underlying structures may reflect substantially all of the light reflected by the second electrode 250. The reflected light may pass through the second electrode 250, and the light may be substantially superimposed with the light previously passing through the second electrode 250. Such a process may be repeated continuously, and thus intensity of the light of the display device 100 having the resonance construction may be substantially higher than the intensity of light in a device having a non-resonance construction.

In the display device 100 having the resonance construction according to example embodiments, linearity of the light may be substantially increased as the intensity of the light is increased. When the light emitted from the light emitting layer 210 has relatively strong linearity, a color shift phenomenon of images may occur in the display device 100. For example, when a user watches obliquely the display device 100, the color shift phenomenon of the images may be generated. To decrease or remove the color shift phenomenon, the second substrate 290 may include the light scattering structure 295 having the recess shape. For example, as described above, when the superimposed light passes through the second substrate 290 including the light scattering structure 295 having the recess shape, the superimposed lights may be scattered effectively. Accordingly, quality of the images may be improved by reducing or removing the color shift phenomenon of the images displayed by the display device 100.

FIGS. 2A to 2E are cross-sectional views illustrating a method of manufacturing a display device in accordance with example embodiments.

Figure 2A:
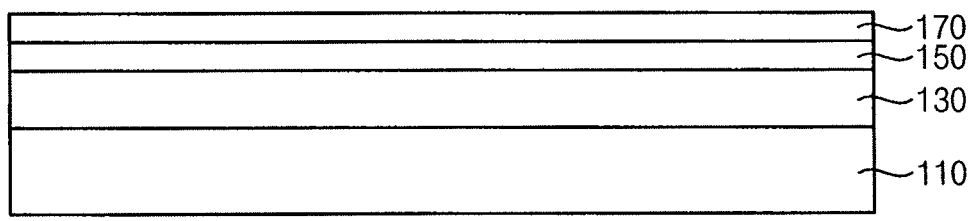
FIGS. 2A to 2E illustrate cross-sectional views of stages in a method of manufacturing a display device in accordance with example embodiments.

Referring to FIG. 2A, the insulating layer 130 may be formed on the first substrate 110, and then the switching element 150 may be formed on the insulating layer 130.

The first substrate 110 may be formed using a transparent material or a material having predetermined flexibility. The insulating layer 130 may be formed using an inorganic material or an organic material. The switching element 150 may be obtained by general processes of forming a transistor.

The insulating interlayer 170 covering the switching element 150 may be formed on the insulating layer 130. The insulating interlayer 170 may be formed using, e.g., silicon oxide, metal oxide, etc.

Figure 2B:
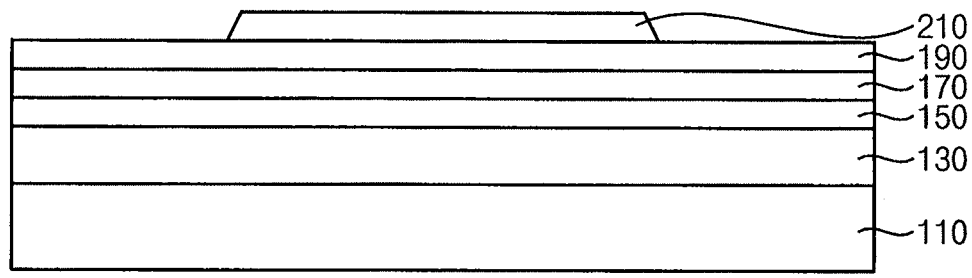

Referring to FIG. 2B, the first electrode 190 may be formed on the insulating interlayer 170. The first electrode 190 may be formed using metal, alloy, metallic nitride, conductive metal oxide, a transparent conductive material, etc.

The light emitting layer 210 may be formed on the first electrode 190. The light emission layer 210 may be formed as a multiple layer structure including a hole injection layer, a hole transfer layer, an organic light emitting layer, an electron transfer layer, an electron injection layer, etc. In example embodiments, the organic light emitting layer of the light emitting layer 210 may be formed using light emitting materials capable of generating different colors of light such as red color of light, blue color of light, and green color of light in accordance with the types of the pixels of display device 100. In some example embodiments, the organic light emitting layer of the light emitting layer 210 may be formed to generate substantially white color of light by stacking a plurality of light emitting materials capable of generating different colors of light such as red color of light, green color of light, blue color of light, etc.

Figure 2C:
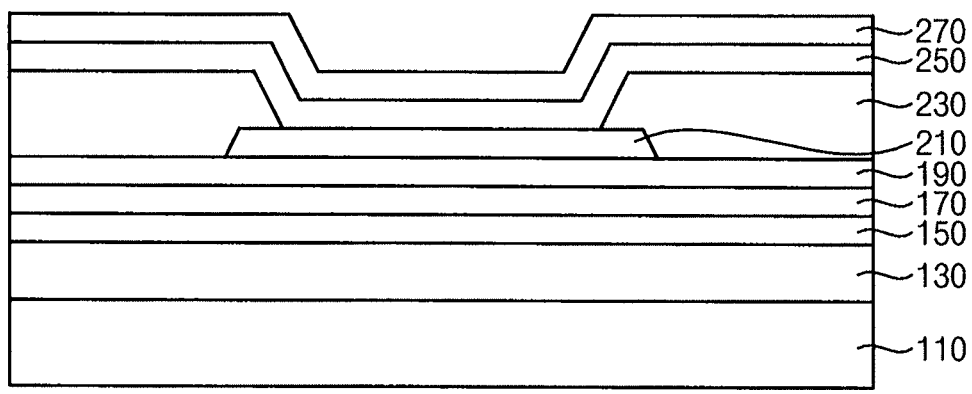

Referring to FIG. 2C, the pixel defining layer 230 may be formed on the light emitting layer 210 and the first electrode 190. An opening partially exposing the light emitting layer 210 may be formed by partially etching the pixel defining layer 230. The pixel defining layer 230 may be formed using an organic material or an inorganic material.

The second electrode 250 may be disposed on the pixel defining layer 230 and in the opening to contact the light emitting layer 210. The protection layer 270 may be formed on the second electrode 250. The protection layer 270 may be formed using, e.g., silicon oxide, metal oxide, etc.

Figure 2D:
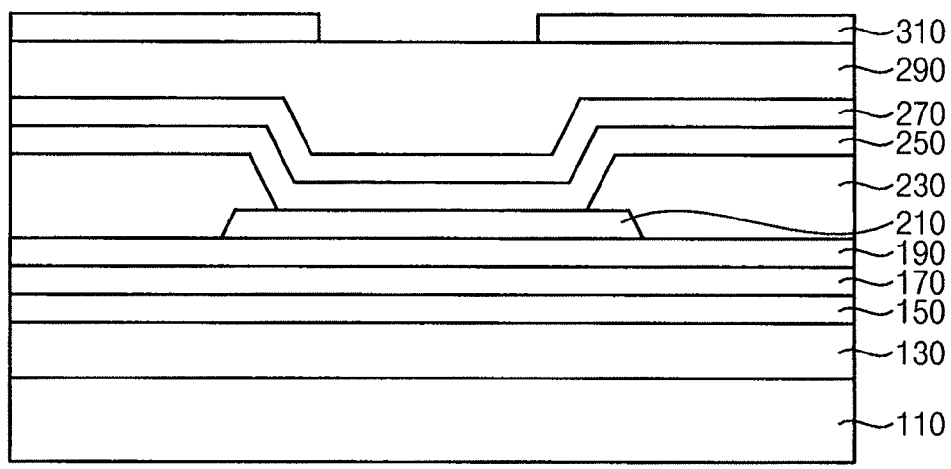

Referring to FIG. 2D, the second substrate 290 may be disposed on the protection layer 270. The second substrate 290 may be formed using a transparent inorganic material, a material having predetermined flexibility, etc.

The shielding member 310 may be formed on the second substrate 290. The shielding member 310 may be formed using metal, metal oxide, etc. In example embodiments, after a metal layer (not illustrated) or a metal oxide layer (not illustrated) is formed on the second substrate 290, the shielding member 310 may be formed in the peripheral region II of the second substrate 290 by partially etching, e.g., removing, a portion of the metal layer or the metal oxide layer from the first region. For example, the shielding member 310 may expose the display region I of the second substrate 290.

Figure 2E:
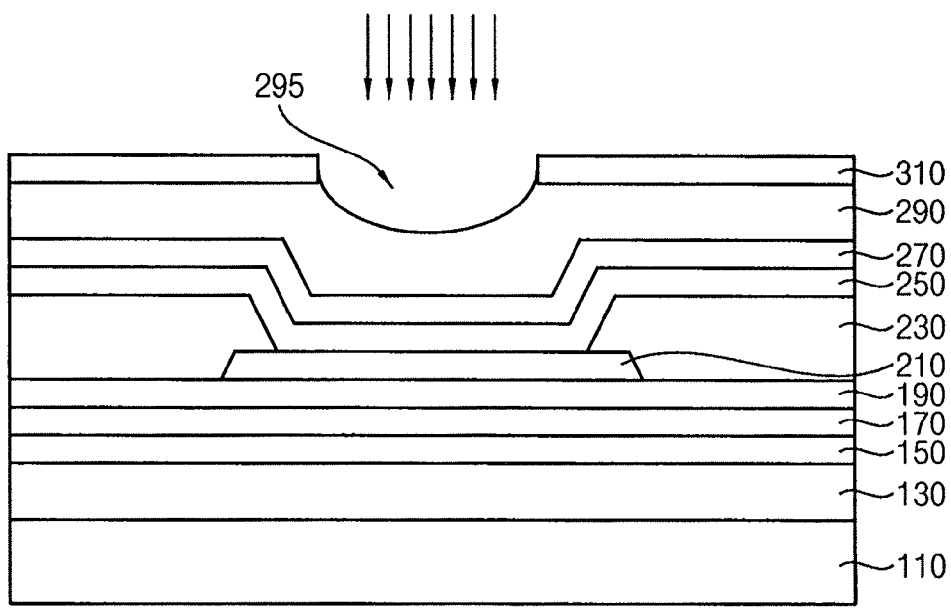

Referring to FIG. 2E, the light scattering structure 295 may be formed in the display region I of the second substrate 290 by removing a portion of the second substrate 290 exposed through the shielding member 310. In example embodiments, the light scattering structure 295 may be obtained by forming a recess having a substantially rounded bottom surface in the display region I of the second substrate 290. For example, the light scattering structure 295 may correspond to the recess having a bottom surface of a substantially semi-elliptical or a substantially semicircular structure, e.g., as a concave lens. In this case, the shielding member 310 may be used as a mask for forming the light scattering structure 295 having the recess shape in the second substrate 290. The light scattering structure 295 having the recess shape scatters effectively light, which is generated from the light emitting layer 210 and is amplified by the resonance construction, so quality of images may be improved by reducing or removing a color shift phenomenon of the images.

Figure 3:
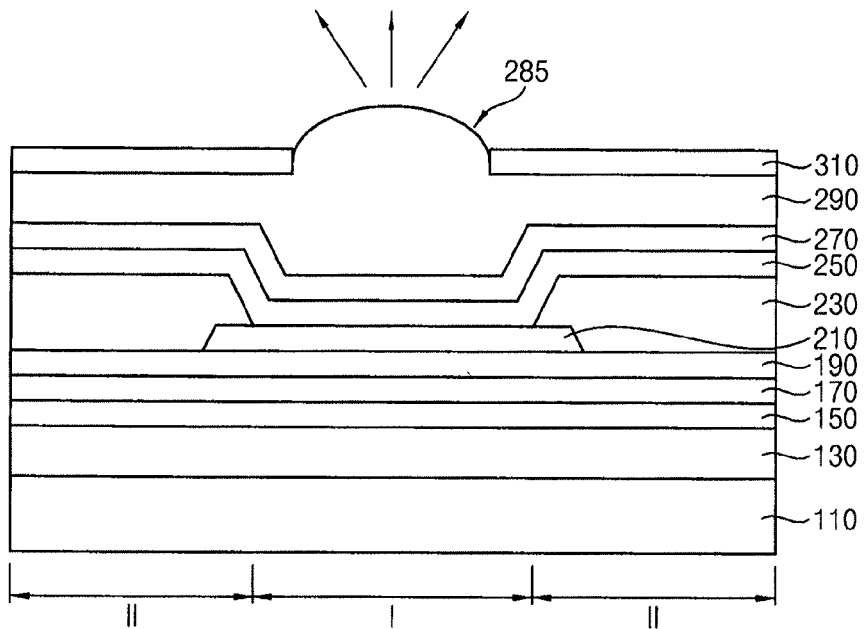
FIG. 3 illustrates a cross-sectional view of a display device in accordance with other example embodiments.

FIG. 3 is a cross-sectional view illustrating a display device in accordance with some example embodiments. The display device illustrated in FIG. 3 may have a configuration substantially the same as or substantially similar to that of the display device 100 described with reference to FIG. 1, except a light scattering structure 285. In FIG. 3, detailed descriptions for elements, which are substantially the same as or substantially similar to the elements described with reference to FIG. 1 will be omitted.

Referring to FIG. 3, the light scattering structure 285 having a protrusion shape may be disposed in the display region I of the second substrate 290, and the shielding member 310 may be located in the peripheral region II adjacent to the light scattering structure 285. In example embodiments, the protrusion of the light scattering structure 285 may include a substantially rounded top surface. For example, the top surface of the protrusion may have a substantially semi-circular or a substantially semi-elliptical shape, etc.

In example embodiments, after an etching mask exposing the peripheral region II of the second substrate 290 is formed on the second substrate 290, the second substrate 290 may be partially etched using the mask, so the light scattering structure 285 having the protrusion shape may be formed in the display region I of the second substrate 290. For example, when a length of the display region I is about 20 µm to about 30 µm, the protrusion may have a height below about 1.0 µm. When the light scattering structure 285 includes the protrusion, i.e., a structure substantially similar to a convex lens, the light scattering structure 285 may scatter effectively the light generated in light emitting layer 210 and is amplified by the resonance construction. Accordingly, the display device may ensure images having improved quality because color shift of phenomenon of the images may be reduced or removed.

Figure 4:
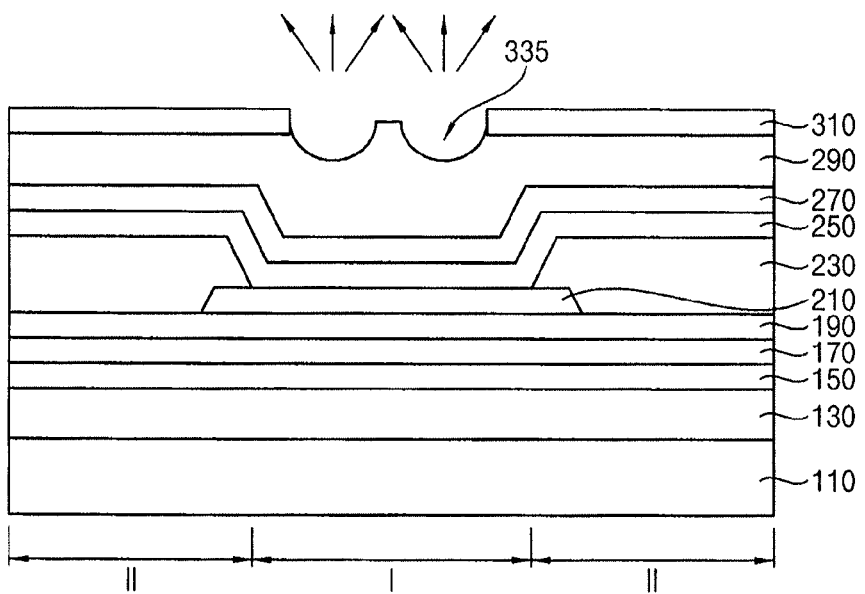
FIG. 4 illustrates a cross-sectional view of a display device in accordance with other example embodiments.

FIG. 4 is a cross-sectional view illustrating a display device in accordance with some example embodiments. In FIG. 4, detailed descriptions for elements substantially the same as or substantially similar to the elements in FIG. 1 will be omitted. The display device illustrated in FIG. 4 may have a configuration substantially the same as or substantially similar to that of the display device 100 described with reference to FIG. 1, except a light scattering structure 335.

Referring to FIG. 4, the light scattering structure 335 located in the display region I of the second substrate 290 may include a plurality of recesses arranged adjacent to one another. The shielding member 310 may be disposed in a peripheral region II adjacent to the light scattering structure 335 having the plurality of recesses.

Although two recesses are illustrated in FIG. 4, the light scattering structure 335 may include more than two recesses, e.g., three recesses or more. Here, each of the recesses respectively may have a substantially rounded bottom surface, for example, a substantially semi-circular shaped bottom surface or a substantially semi-elliptical shaped bottom surface. When a length of the display region I is about 20 µm to about 30 µm, a depth of the recess may be below about 0.5 µm. In processes of forming the light scattering structure 335 according to example embodiments, formation of the plurality of recesses may be obtained by etching the second substrate 290, which may be substantially easier than formation of one recess by etching the second substrate 290. That is, a process of shallow etching, e.g., forming recesses with smaller depths in the second substrate 290, may be easier and faster, and may impart less damage to underlying structures.

As described above, when the light scattering structure 335 includes the plurality of recesses, which are substantially similar to convex lenses, the light scattering structure 335 may scatter effectively the light generated in light emitting layer 210 with increased intensity by the resonance construction. Accordingly, the color shift phenomenon of images may be effectively reduced or removed to ensure improved quality of the images.

Figure 5:
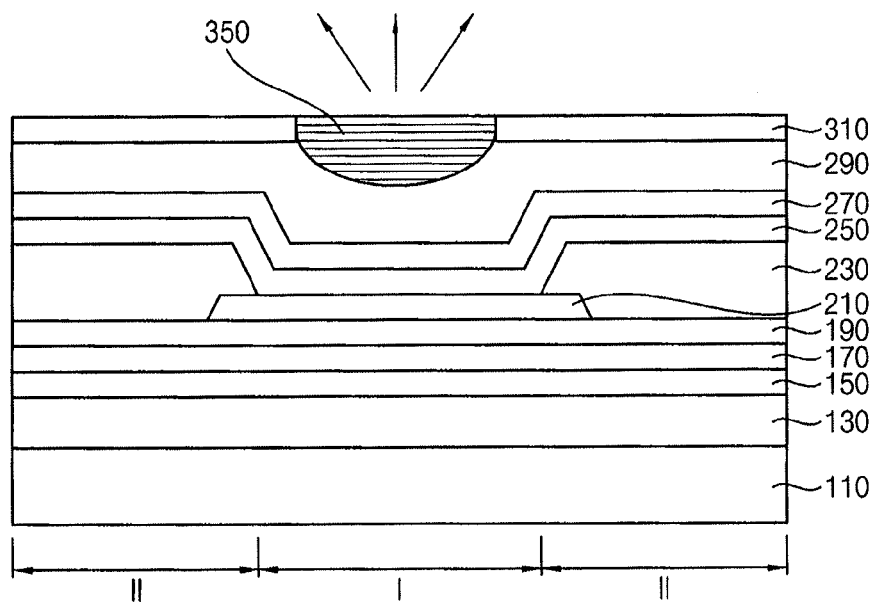
FIG. 5 illustrates a cross-sectional view of a display device in accordance with other example embodiments.

FIG. 5 is a cross-sectional view illustrating a display device in accordance with some example embodiments. In FIG. 5, detailed descriptions for elements substantially the same as or substantially similar to the elements in FIG. 1 will be omitted. The display device illustrated in FIG. 5 may have a configuration substantially the same as or substantially similar to that of the display device 100 described with reference to FIG. 1, except a light scattering structure including a transparent member 350.

Referring to FIG. 5, the light scattering structure includes the transparent member 350 buried in the recess that is disposed in the display region I of the second substrate 290. In example embodiments, the recess may have a substantially rounded bottom surface, and the transparent member 350 substantially filling the recess may have a substantially rounded bottom surface. For example, the bottom surface of the transparent member 350 may have a substantially semi-circular shape, a substantially semi-elliptical shape, etc. The shielding member 310 may be positioned adjacent to the transparent member 350 in the peripheral region II, e.g., the shielding member 310 may be in direct contact with an upper portion of the transparent member 350.

As for the light scattering structure having the recess and the transparent member 350 according to example embodiments, after the recess is formed on the second substrate 290 by a process substantially the same as or substantially similar to the process described with reference to FIG. 2E, the light scattering structure may be obtained by filling the recess with the transparent member 350. The transparent member 350 may include an organic material. In this case, a refractive index of the transparent member 350 may be different from a refractive index of the second substrate 290. For example, a transparent member 350 may include a polyimide-based resin, a photoresist, an acrylic-based resin, a polyamide-based resin, a siloxane-based resin, etc. Because the light scattering structure having the transparent member 350 may scatter more effectively light than a light scattering structure having the recess only, quality of images may be additionally improved.

Figure 6:
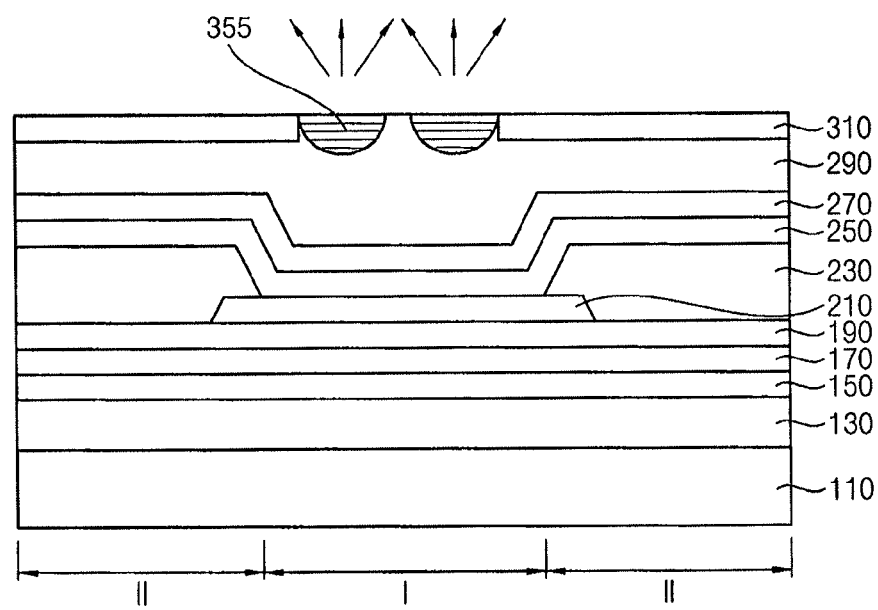
FIG. 6 illustrates a cross-sectional view of a display device in accordance with other example embodiments.

FIG. 6 is a cross-sectional view illustrating a display device in accordance with some example embodiments. In FIG. 6, detailed descriptions for elements substantially the same as or substantially similar to those of the elements in FIGS. 1 and 4 will be omitted. The display device illustrated in FIG. 6 may have a configuration substantially the same as or substantially similar to that of the display device 100 described with reference to FIG. 1, except a light scattering structure having a plurality of recesses and a plurality of transparent members 355.

Referring to FIG. 6, the light scattering structure having the plurality of recesses and the plurality of transparent members 355 respectively filling the recesses may be disposed in the display region I of the second substrate 290. The shielding member 310 may be located adjacent to the transparent members 355 in the peripheral region II of the second substrate 290.

The transparent members 355 may have a refractive index different from a refractive index of the second substrate 290, and the transparent members 355 may include an organic material. Additionally, the transparent members 355 may have a substantially rounded bottom surface such as a substantially semi-circular shape or a substantially semi-elliptical shape. When the light scattering structure includes the recesses and the transparent members 355, light generated from the light emitting layer 210 may be scattered more effectively, and thus quality of images may be further improved.

Figure 7:
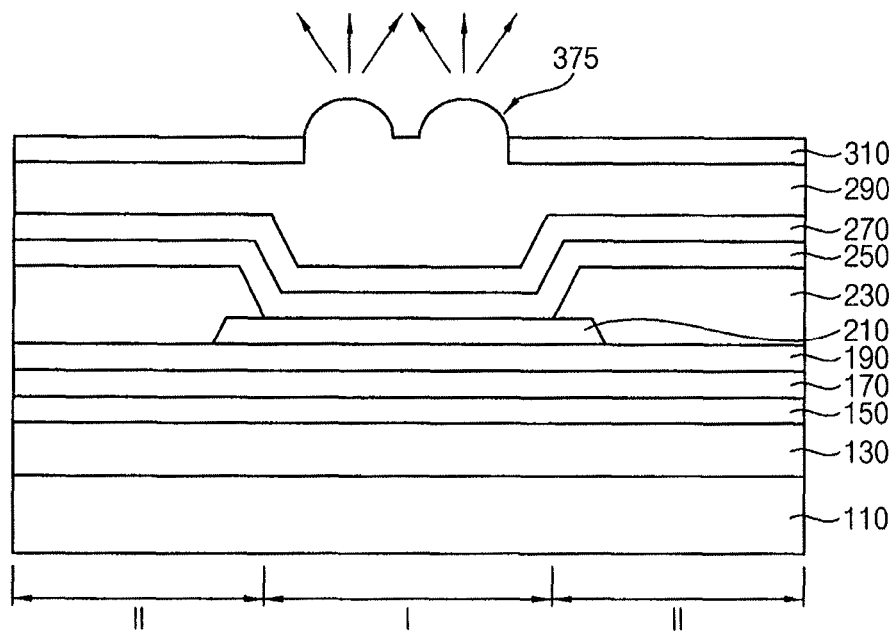
FIG. 7 illustrates a cross-sectional view of a display device in accordance with other example embodiments.

FIG. 7 is a cross-sectional view illustrating a display device in accordance with some example embodiments. In FIG. 7, detailed descriptions for elements substantially the same as or substantially similar to those of the elements in FIG. 1 will be omitted. The display device illustrated in FIG. 7 may have a configuration substantially the same as or substantially similar to that of the display device 100 described with reference to FIG. 1, except a light scattering structure having a plurality of protrusions 375.

Referring to FIG. 7, the light scattering structure including the plurality of protrusions 375 may be disposed on the display region I of the second substrate 290. The shielding member 310 may be positioned adjacent to the protrusions 375 in the peripheral region II of the second substrate 290. Here, each of the protrusions 375 may have a substantially rounded top surface. For example, each protrusion 375 may have a top surface substantially similar to a concave lens, e.g., a substantially semi-circular shape or a substantially semi-elliptical shape. When the light scattering structure includes the plurality of the protrusions 375, the light scattering structure may scatter light more effectively than the light scattering structure described with reference to FIG. 3, and thus images of improved quality may be provided by the display device. The light scattering structure may be readily obtained by changing a shape of an etching mask for etching the second substrate 290.

Figure 8:
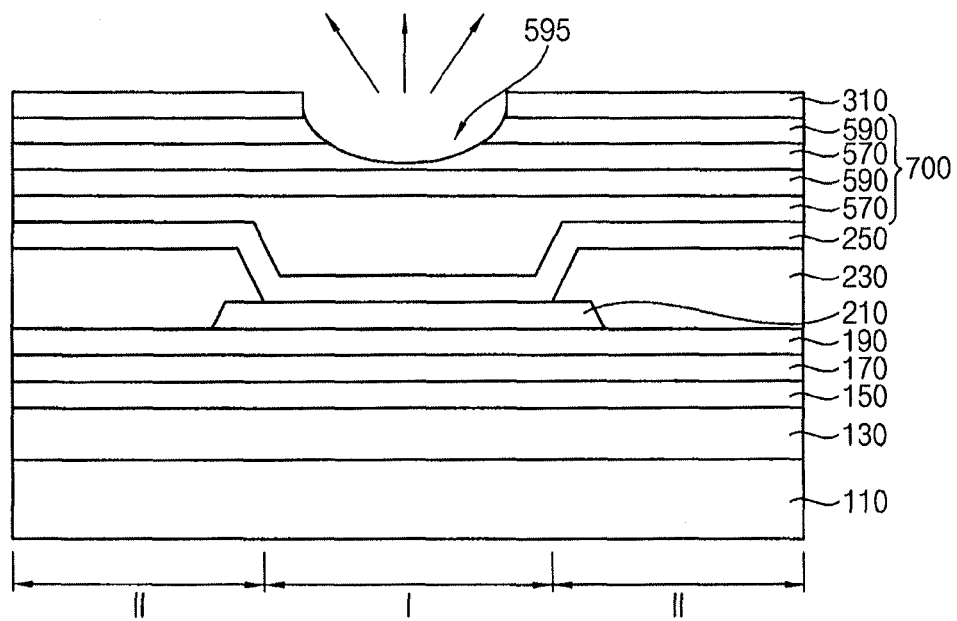
FIG. 8 illustrates a cross-sectional view of a display device in accordance with other example embodiments.

FIG. 8 is a cross-sectional view illustrating a display device in accordance with some example embodiments. In FIG. 8, detailed descriptions for elements substantially the same as or substantially similar to those of the elements in FIG. 1 will be omitted. The display device illustrated in FIG. 8 may have a configuration substantially the same as or substantially similar to that of the display device 100 described with reference to FIG. 1, except a construction of a second substrate 700 and a light scattering structure 595.

Referring to FIG. 8, the second substrate 700 may have a structure in which at least one organic layer and at least one inorganic layer are stacked. In example embodiments, the second substrate 700 may have a structure of at least one organic layer 570 and at least one inorganic layer 590 disposed alternately on the second electrode 250. The light scattering structure 595 having a recess may be formed in the at least one organic layer 570 and the at least one inorganic layer 590. For example, the light scattering structure 595 may be formed in an uppermost organic layer 570 and an uppermost inorganic layer 590.

In example embodiments, each of organic layers 570 may include a transparent organic material. For example, each of the organic layers 570 may include a polyimide-based resin, a photoresist, an acrylic-based resin, a polyamide-based resin, a siloxane-based resin, etc. These may be used alone or in a combination thereof. Each of the inorganic layers 590 may include a transparent organic material. For example, each inorganic layer 590 may include silicon oxide, silicon nitride, silicon oxynitride, silicon oxycarbide, silicon carbonitride, etc. These may be used alone or in a combination thereof. The second substrate 700 including a plurality of the organic layer 570 and a plurality of the inorganic layer 590 may effectively prevent display structures, e.g., an insulating layer, a switching element, an insulating interlayer, a first electrode, a light emitting layer, a pixel defining layer, a second electrode, and protection layer 270, from being deteriorated by penetration of moisture, oxygen, etc. Further, because the display device may include the light scattering structure positioned in the organic layers 570 and the inorganic layers 590, quality of images displayed by the display device may be improved by scattering light generated in the light emitting layer 210.

Figure 9:
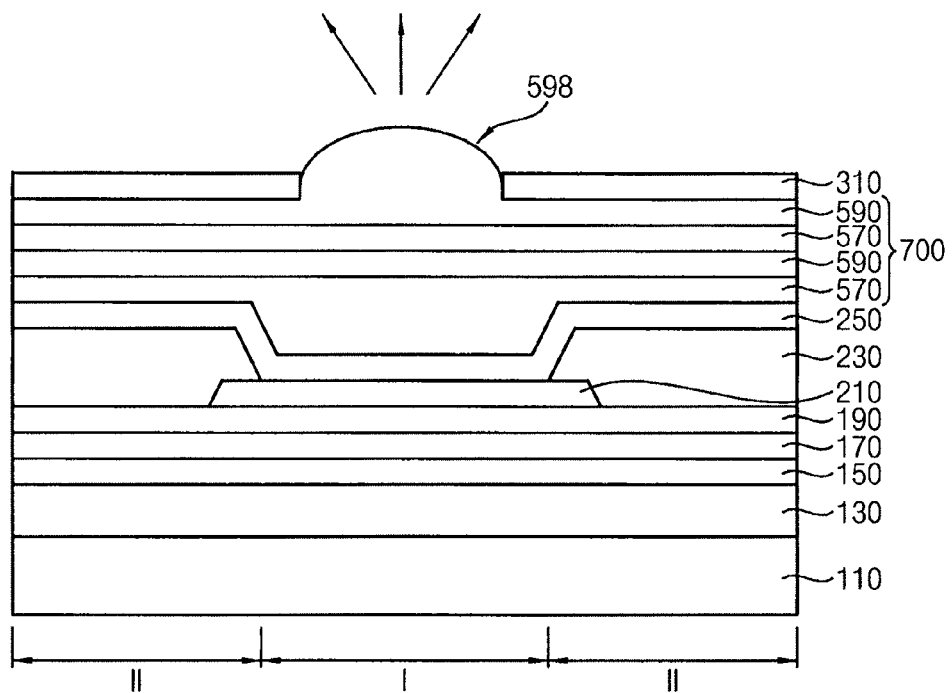
FIG. 9 illustrates a cross-sectional view of a display device in accordance with other example embodiments.

FIG. 9 is a cross-sectional view illustrating a display device in accordance with some example embodiments. In FIG. 9, detailed description for elements substantially the same as or substantially similar to those of the elements in FIG. 1 will be omitted. The display device illustrated in FIG. 9 may have a configuration substantially the same as or substantially similar to that of the display device 100 described with reference to FIG. 1, except the second substrate 700 and the light scattering structure 598.

Referring to FIG. 9, the second substrate 700 may include a structure in which at least one organic layer and at least one inorganic layer are alternately stacked. In example embodiments, the light scattering structure 598 located in the display region I of the second substrate 700 may include a protrusion formed on an uppermost inorganic layer 590. For example, the protrusion of the light scattering structure 598 may have a substantially rounded top surface, e.g., a substantially semi-circular shape or a substantially semi-elliptical shape.

In some example embodiments, an uppermost portion of the second substrate 700 may be the organic layer 570. In this case, the light scattering structure 598 may include the protrusion positioned on the uppermost organic layer 570.

Figure 10:
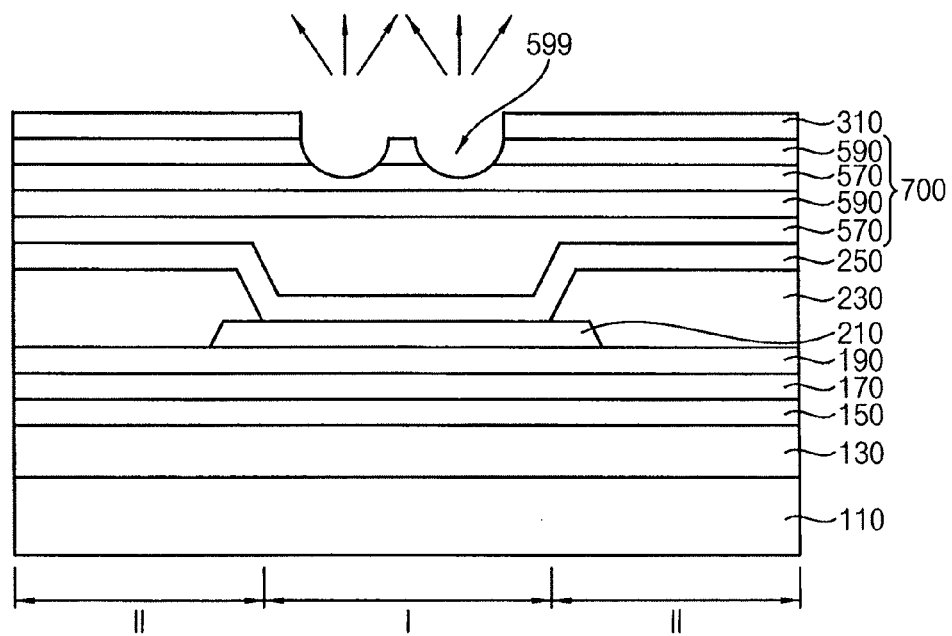
FIG. 10 illustrates a cross-sectional view of a display device in accordance with other example embodiments.

FIG. 10 is a cross-sectional view illustrating a display device in accordance with some example embodiments. In FIG. 10, detailed descriptions for elements substantially the same as or substantially similar to those of the elements in FIG. 1 will be omitted. The display device illustrated in FIG. 10 may have a configuration substantially the same as or substantially similar to that of the display device 100 described with reference to FIG. 1, except the second substrate 700 and the light scattering structure 599.

Referring to FIG. 10, the second substrate 700 may include a plurality of an organic layer 570 and a plurality of an inorganic layer 590, which are disposed alternately. Additionally, the light scattering structure 599 located in the display region I of the second substrate 700 may include a plurality of recesses. Here, each of the recesses of the light scattering structure 599 may be positioned in the uppermost inorganic layer 590 and the uppermost organic layer 570.

Figure 11:
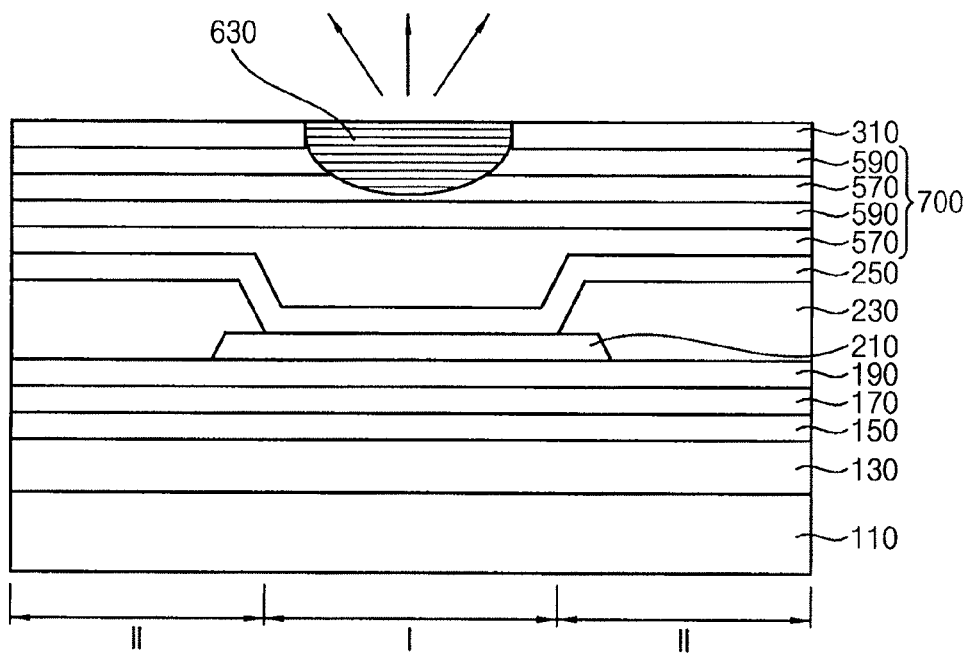
FIG. 11 illustrates a cross-sectional view of a display device in accordance with other example embodiments.

FIG. 11 is a cross-sectional view illustrating a display device in accordance with some example embodiments. In FIG. 11, detailed descriptions for elements substantially the same as or substantially similar to those of the elements in FIG. 1 will be omitted. The display device illustrated in FIG. 11 may have a configuration substantially the same as or substantially similar to that of the display device 100 described with reference to FIG. 1, except the second substrate 700 and a light scattering structure having a transparent member 630. Further, the second substrate 700 of the display device may have a construction substantially the same as that of the second substrate 700 described with reference to FIG. 8.

Referring to FIG. 11, the light scattering structure having a recess and the transparent member 630 may be disposed in the display region I of the second substrate 700 including the plurality of organic layers 570 and the plurality of inorganic layers 590. The shielding member 310 may be disposed in the peripheral region II of the second substrate 700, which may be adjacent to the light scattering structure. In example embodiments, a refractive index of the transparent member 630 may be different from a refractive index of the organic layer 570 of the second substrate 290. Alternatively, a refractive index of the transparent members 630 of the light scattering structure may be different from a refractive index of the inorganic layer 590 of the second substrate 290.

Figure 12:
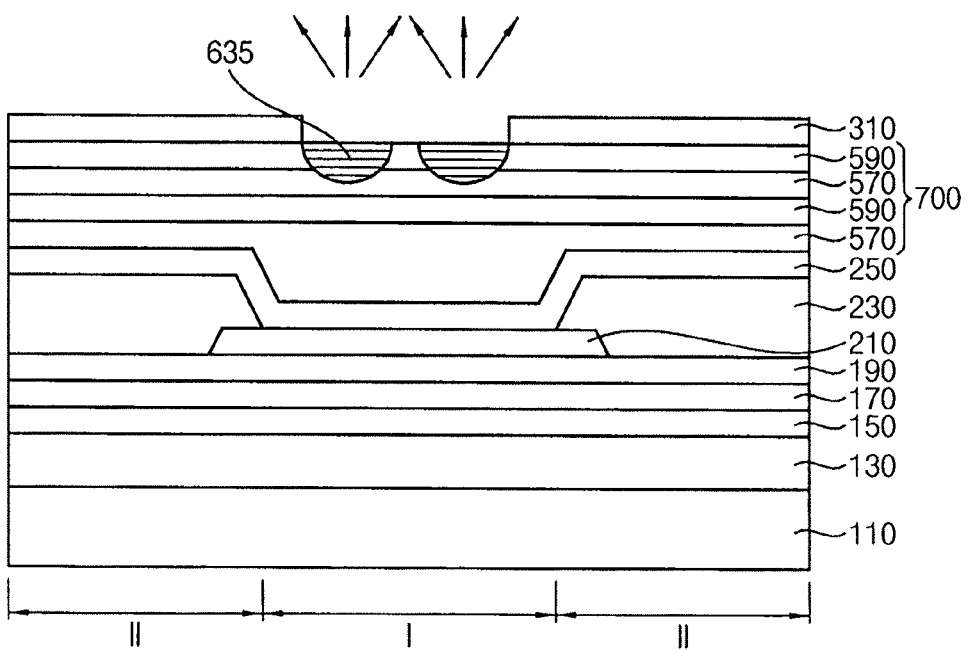
FIG. 12 illustrates a cross-sectional view of a display device in accordance with other example embodiments.

FIG. 12 is a cross-sectional view illustrating a display device in accordance with some example embodiments. In FIG. 12, detailed descriptions for elements substantially the same as or substantially similar to the elements in FIG. 1 will be omitted. The display device illustrated in FIG. 12 may have a configuration substantially the same as or substantially similar to that of the display device 100 described with reference to FIG. 1, except the second substrate 700 and a light scattering structure having a plurality of transparent members 635.

Referring to FIG. 12, the light scattering structure, which may be located in the display region I of the second substrate 700 including the organic layers 570 and the inorganic layers 590 may include a plurality of recesses and the plurality of transparent members 635 filling the recesses, respectively. The shielding member 310 may be located in the peripheral region II adjacent to an outermost transparent member 635. A refractive index of each transparent member 635 may be different from a refractive index of each organic layer 570 and/or that of each inorganic layer 590 of the second substrate 700.

Figure 13:
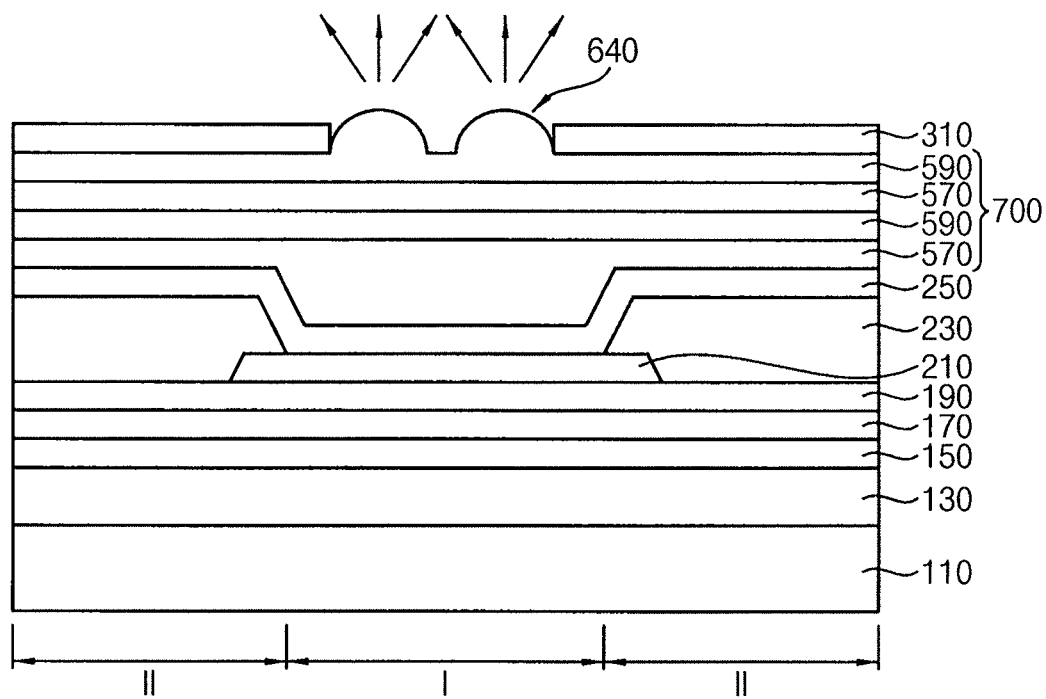
FIG. 13 illustrates a cross-sectional view of a display device in accordance with other example embodiments.

FIG. 13 is a cross-sectional view illustrating a display device in accordance with some example embodiments. In FIG. 13, detailed descriptions for elements substantially the same as or substantially similar to the elements in FIG. 1 will be omitted. The display device illustrated in FIG. 13 may have a configuration substantially the same as or substantially similar to that of the display device 100 described with reference to FIG. 1, except the second substrate 700 and a light scattering structure having a plurality of protrusions 640. Additionally, the light scattering structure including protrusions 640 illustrated in FIG. 13 may have a construction substantially the same as that of the light scattering structure including the protrusions 375 described with reference to FIG. 7.

Referring to FIG. 13, the light scattering structure having a plurality of protrusions 640 may be disposed on the second substrate 700 including the organic layers 570 and the inorganic layers 590. In example embodiments, the protrusions 640 of the light scattering structure may be disposed on the uppermost inorganic layer 590 in the display region I. The shielding member 310 may be disposed in the peripheral region II adjacent to the protrusions 640. For example, the shielding member 310 may be located adjacent to the outermost protrusion 640. In some example embodiments, the protrusions 640 of the light scattering structure may be formed on the uppermost organic layer 570.

According to example embodiments, a display device may have a light resonance construction and may include a light scattering structure having at least one recess or at least one protrusion. Accordingly, scattering of light generated in a light emitting layer of the display device may be effectively accomplished, and color shift phenomenon may be reduced or prevented to thereby improve quality of images displayed on the display device.

In contrast, to settle the color shift phenomenon of images, a conventional display device includes a polarizer, a prism sheet, and the like. For example, the prism sheet may scatter the light generated in the organic light emitting layer, so the color shift phenomenon may be somewhat reduced. However, when the display device includes the polarizer, the prism sheet and the like, the display device may have increased weight and size, as well as increased manufacturing costs.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A display device, comprising:
   a first substrate having a display region and a peripheral region;

a display structure in the display region;

a second substrate parallel to the first substrate, the second substrate including a light scattering structure in the display region, the light scattering structure being configured to scatter light generated in the display structure; and a light shielding member on the second substrate in the peripheral region, the light shielding member being adjacent to the light scattering structure and having a through-hole through which the light scattering structure is exposed.

2. The display device as claimed in claim 1, wherein the light scattering structure includes at least one recess.

3. The display device as claimed in claim 2, wherein the recess has a rounded bottom surface.

4. The display device as claimed in claim 2, wherein the light scattering structure further comprises a transparent member in the recess.

5. The display device as claimed in claim 4, wherein the transparent member has a refractive index different from a refractive index of the second substrate.

6. The display device as claimed in claim 5, wherein the transparent member includes a polyimide-based resin, a photoresist, an acrylic-based resin, a polyamide-based resin, and/or a siloxane-based resin.

7. The display device as claimed in claim 2, wherein the light scattering structure has a plurality of recesses.

8. The display device as claimed in claim 7, wherein the light scattering structure further comprises a plurality of transparent members in the plurality of recesses, respectively.

9. The display device as claimed in claim 1, wherein the light scattering structure includes at least one protrusion.

10. The display device as claimed in claim 9, wherein the protrusion has a rounded top surface.

11. The display device as claimed in claim 9, wherein the light scattering structure has a plurality of protrusions.

12. The display device as claimed in claim 1, wherein the second substrate includes alternating organic layers and inorganic layers.

13. The display device as claimed in claim 12, wherein the light scattering structure includes at least one recess, each recess that is in the light scattering structure being in both an uppermost inorganic layer and an uppermost organic layer.

14. The display device as claimed in claim 12, wherein the light scattering structure includes at least one protrusion disposed on an uppermost inorganic layer.

15. The display device as claimed in claim 1, wherein the light shielding member does not physically overlap the light scattering structure, and the light shielding member having a substantially black color includes chrome or chrome oxide.

16. A method of manufacturing a display device, the method comprising:

forming a first substrate having a display region and a peripheral region;

forming a display structure in the display region;

forming a second substrate on the display structure and parallel to the first substrate;

forming a light scattering structure on the second substrate, the light scattering structure being in the display region; and forming a light shielding member on the second substrate in the peripheral region, the light shielding member being adjacent to the light scattering structure and having a through-hole through which the light scattering structure is exposed.

17. The method of manufacturing a display device as claimed in claim 16, wherein forming the light scattering structure includes forming at least one recess by partially etching the second substrate in the display region.

18. The method of manufacturing a display device as claimed in claim 17, wherein forming the light scattering structure further comprises forming at least one transparent member filling the at least one recess.

19. The method of manufacturing a display device as claimed in claim 16, wherein forming the light scattering structure includes forming at least one protrusion on the second substrate in the display region by partially etching the second substrate in the peripheral region.

20. The method of manufacturing a display device as claimed in claim 16, wherein forming the second substrate includes alternately stacking a plurality of organic layers and a plurality of inorganic layers on the display structure.

21. The method of manufacturing a display device as claimed in claim 20, wherein forming the light scattering structure includes forming at least one recess, each recess of the at least one recess that is in the light scattering structure being in both an uppermost organic layer and an uppermost inorganic layer, or forming at least one protrusion on an uppermost inorganic layer.

* * * * *